(12) United States Patent
Singh

(10) Patent No.: US 9,335,968 B2
(45) Date of Patent: *May 10, 2016

(54) EXPANDED SCOPE INCREMENTER

(71) Applicant: International Business Machines Corporation, Armonk, NY (US)

(72) Inventor: Deepak K Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/926,918

(22) Filed: Jun. 25, 2013

(65) Prior Publication Data

US 2013/0290393 A1    Oct. 31, 2013

Related U.S. Application Data

(62) Division of application No. 12/852,660, filed on Aug. 9, 2010, now Pat. No. 8,554,821.

(51) Int. Cl.
    *G06F 7/50*     (2006.01)
    *G06F 7/505*    (2006.01)
(52) U.S. Cl.
    CPC ..................... *G06F 7/5055* (2013.01)
(58) Field of Classification Search
    USPC ........................................................ 708/672
    See application file for complete search history.

(56) References Cited

U.S. PATENT DOCUMENTS

| 4,550,432 | A | 10/1985 | Andersson |
| 4,945,497 | A | 7/1990 | Malachowsky et al. |
| 5,179,647 | A | 1/1993 | Chang |
| 5,258,943 | A | 11/1993 | Gamez et al. |
| 5,917,741 | A | 6/1999 | Ng |
| 6,211,806 | B1 | 4/2001 | McCarroll |
| 6,505,225 | B1 | 1/2003 | Takayanagi |
| 6,542,915 | B1 | 4/2003 | Dibrino et al. |
| 6,701,422 | B2 | 3/2004 | Bao |
| 2004/0158599 | A1 | 8/2004 | Kwon |
| 2005/0289210 | A1 | 12/2005 | Langsdorf |

*Primary Examiner* — Tan V. Mai
(74) *Attorney, Agent, or Firm* — Thomas E. Tyson; Steven Meyers; Mark McBurney

(57) ABSTRACT

An incrementor circuit and method for incrementing is provided that computes an output data word by increasing an input data word magnitude by one of several integer values. The incrementor circuit includes a mode increment signal circuit providing a designation of one of the integer values for increasing the input data word magnitude. A single constant incrementor is connected to the mode increment signal circuit and the input data word and provides an intermediate sum by selectively adding a constant to the input data word. A multiplex circuit logically combines selected input data word bit position values with the mode increment signal circuit designation forming logical bit position values and directs selected input data word bit position values, selected logical bit position values, and selected bit position values of the intermediate sum to form the output data word.

7 Claims, 5 Drawing Sheets

EXPANDED SCOPE INCREMENTER

CROSS REFERENCE TO RELATED APPLICATIONS

This application is a divisional of, and claims benefit of the filing date of, copending U.S. patent application Ser. No. 12/852,660 entitled "EXPANDED SCOPE INCREMENTOR," filed Aug. 9, 2010.

BACKGROUND OF THE INVENTION

1. Technical Field

The present invention relates to digital computers. In particular, the present invention relates to addition circuits in digital computers.

2. Description of the Related Art

Digital computers perform arithmetic computations in executing software programs. The function of computing a sum is accomplished by adder which can be, given a long data word length such as 64 bits or 128 bits wide, a complex circuit. Adders receive two inputs and produce an output that is the sum of the two inputs. However, for additions where one of the inputs has a value of binary 1, an incrementor is used. The incrementor is commonly employed for computing addresses where an address is incremented by one to obtain a next in sequence address. However, if a different type sum is required, the more complex adder is used.

SUMMARY

In accordance with the present invention, an incrementor circuit for computing an output data word by increasing an input data word magnitude by one of several integer values is provided. The incrementor circuit includes a mode increment signal circuit providing a designation of one of integer values for increasing the input data word magnitude. A single constant incrementor is connected to the mode increment signal circuit and the input data word and provides an intermediate sum by selectively adding a constant to the input data word. A multiplex circuit logically combines selected input data word bit position values with the mode increment signal circuit designation forming logical bit position values and directs selected input data word bit position values, selected logical bit position values, and selected bit position values of the intermediate sum to form the output data word.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is an incrementor circuit and a method for incrementing that includes computing an output data word by increasing an input data word magnitude by one of a several integer values. The incrementor circuit includes a mode increment signal circuit providing a designation of one of several integer values for increasing the input data word magnitude. A single constant incrementor is connected to the mode increment signal circuit and the input data word and provides an intermediate sum by selectively incrementing a constant to the input data word. The incrementing may be done on upper n-bits, n-1 bits or n-2 bits of the input data word depending upon the mode. A multiplex circuit logically combines selected input data word bit position values with the mode increment signal circuit designation forming logical bit position values and directs selected input data word bit position values, selected logical bit position values, and selected bit position values of the intermediate sum to form the output data word.

As will be appreciated by one skilled in the art, aspects of the present invention may be embodied as a circuit, system, or a method. Accordingly, aspects of the present invention may take the form of an entirely hardware embodiment or include software (including firmware, resident software, micro-code, etc.) or an embodiment combining software and hardware aspects that may all generally be referred to herein as a "circuit," "module" or "system."

As previously discussed, historically incrementors are circuits that add a single integer constant, '+1', to an input value. Incrementors are commonly used to increase an address value in order to access the next sequentially located address word. One example is a program counter that is used to access the next sequentially located instruction. However, in some computer systems, it is advantageous to add one of several different constant integers to a value. For example an effective address may need to be incremented by different integer values in order to access the same byte (+0), a next byte (+1), a next double word (+2), an address that is three bytes away (+3), or a next word (+4). The following expanded scope incrementor invention provides an incrementor that may add numeric values of +0, +1, +2, +3, or +4 in a single operation. The expanded scope incrementor does not have the complexity of a full scale adder and, therefore, uses a much smaller area than a full scale adder. This results in the expanded scope incrementor using less power and fewer routing resources while executing faster than a full-scale adder.

Figures 1A, 1B:
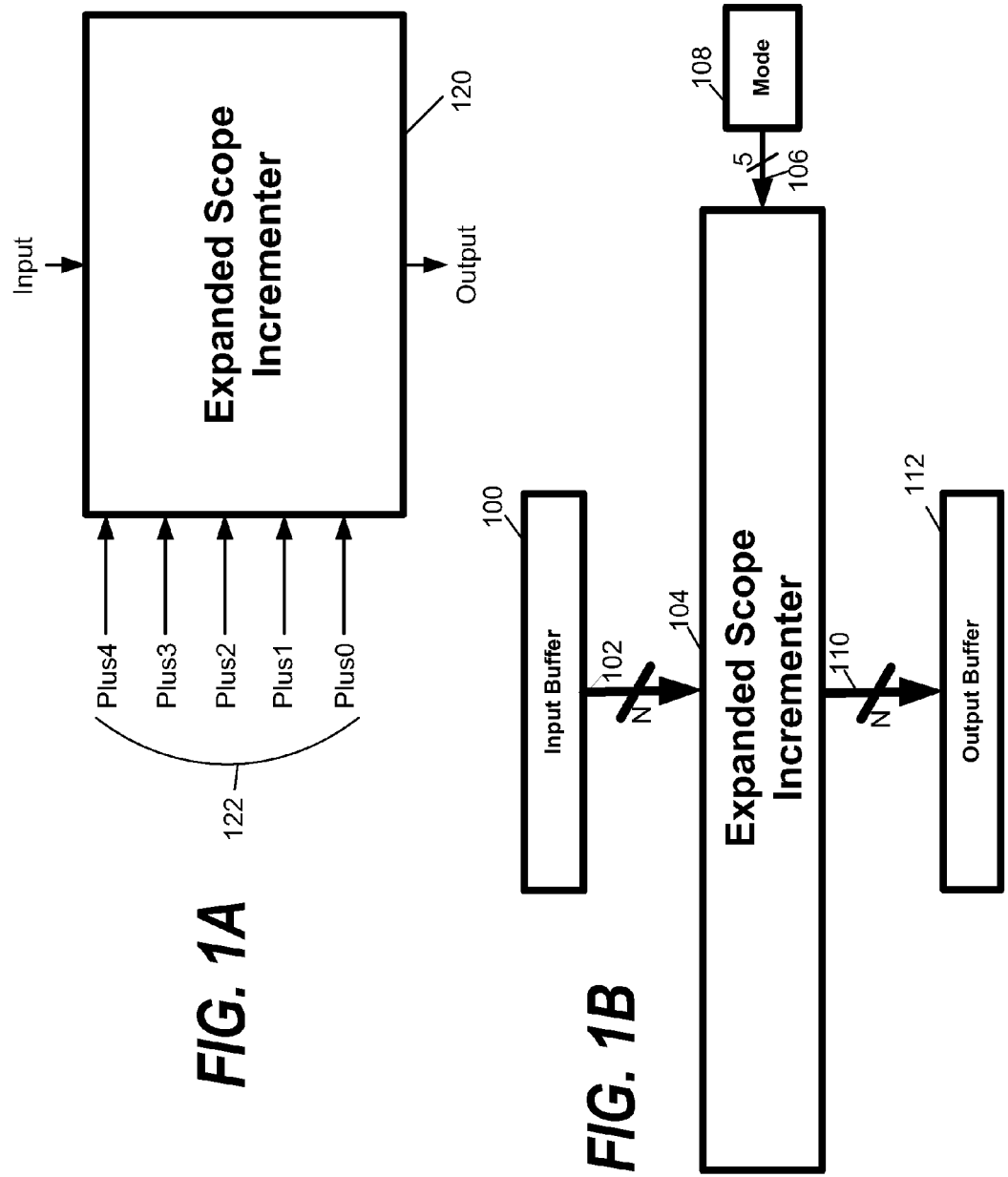
FIG. 1A is a block diagram of the extended scope incrementor.
FIG. 1B is a block diagram illustrating a second embodiment of the extended scope incrementor.

FIG. 1A is a block diagram illustrating an extended scope incrementor 120 connected to receive an input and to provide an output. Additionally the expanded scope incrementor includes five selection signals 122 that would select one of five different integer values for the input magnitude to be incremented by. These values are +0, +1, +2, +3, and +4. This can also be expanded to add +1, +2, . . . , +5, +6, etc . . . and the number of selects will accordingly increase.

FIG. 1B is a block diagram illustrating an expanded scope incrementor 104 connected to an input buffer 100 that provides binary input data word over a parallel input bus 102 into the expanded scope incrementor 104. Additionally, the expanded scope incrementor 104 receives a mode select signal from a mode circuit 108. In a preferred embodiment, the mode select signal is one of five signals input to the expanded scope incrementor 104 on line 106. After incrementing the value from the input buffer 100, the expanded scope incrementor 104 would provide on lines 110 the output value to an output buffer 112. This output value is the input value increased by a magnitude specified by the mode circuit 108. In other words, the input value would be increased by one of the increment values of +0, +1, +2, +3, and +4.

Figure 2:
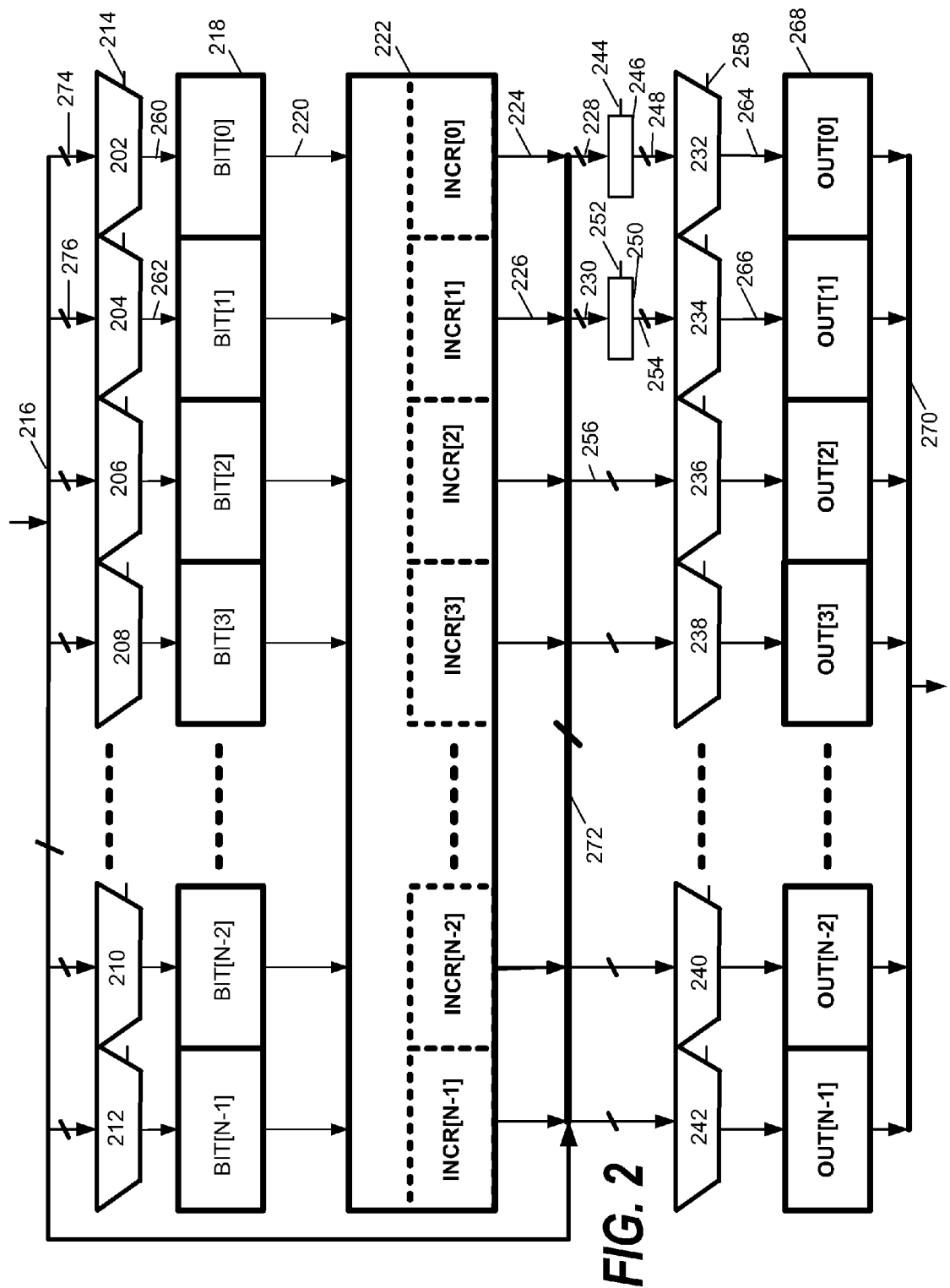
FIG. 2 is block diagram illustrating an embodiment of the extended scope incrementor including a dual level multiplexer configuration with a single incrementor.

FIG. 2 is a schematic diagram of the internal circuitry in the expanded scope incrementor 104 of FIG. 1B. In FIG. 2, a row of multiplex circuits 202, 204, 206, 208, 210 and 212 represent multiplexers that each receive bit position values of an input data word via bus 216. In other words, each multiplexer, such as multiplexer 202, would receive several parallel bit position values from the input data word. In one embodiment, multiplexer 202 is a three input multiplexer selecting one of three input lines to provide as an output based upon a select signal. In this embodiment, multiplexer 202 receives the three least significant bit position values of the input data word. As a definition of bit positions, an 8-bit word contains bit positions of 7 to 0 where bit position 0 is the least significant bit position of the word. In this embodiment with an input data word containing n bits, multiplexer 212 would receive input data word bit position n-1 (or bit position 7 for an 8 bit word) and two null or '0' inputs. Multiplexer 210 would receive bit position n-1 (or bit position 6 for an 8 bit word), bit position n-2 and a single null or '0' input. The remaining multiplexers 208, 206 and 204 would receive three inputs according to this sequence of input positions. Additionally, multiplexers 202, 294, 206, 208, 210 and 212 receive a mode select signal illustrated on line 214 for multiplexer 202. This mode select signal designates the incrementing value such as, for this illustrated embodiment, +0, +1, +2, +3 or +4.

In FIG. 2, a bit buffer 218 is illustrated as receiving bit positions BIT[N-1] through BIT[0]. In a slightly varied implementation, the incrementor can also be modified to produce a carry bit. This carry along with the upper 2 bits from the incrementor INCR[N-1], INCR[N-2] can be sent to a mux that can select one of them depending upon the mode, to generate an overflow bit indicating that the output of this circuitry has overflowed. Each bit position of the bit buffer 218 is provided to a corresponding bit position of a single integer constant incrementor 222. In this embodiment, the incrementor 222 is simply a +1 incrementor. Incrementor 222 provides each bit position output, such as lines 224 and 226, to a data bus 272 which includes the input data word bus 216. In this embodiment two sets of parallel lines, 228 and 230, from data bus 272 are provided to logic circuits 246 and 250 respectively which in turn, provide parallel inputs to multiplexers 232 and 234 on lines 248 and 254 respectively. Logic circuits 246 and 250 include lines 244 and 252 to receive mode select signals. The other multiplexers, 236, 238, 240 and 242 receive inputs directly from data bus 272. Each of the multiplexers 232, 234, 236, 238, 240 and 242 also receive mode select signals as illustrated on line 258 for multiplexer 232. The single bit positions outputs of multiplexers 232, 234, 236, 238, 240 and 242 are then provided over lines such as 264 and 266, for multiplexers 232 and 234 respectively, to an output buffer 268. The output buffer 268 provides the output data word on output data bus 270.

In the illustrated embodiment, buffers 218 and 268 are provided but are optional. In another embodiment, these two buffers 218 and 268 are not required.

Figure 3:
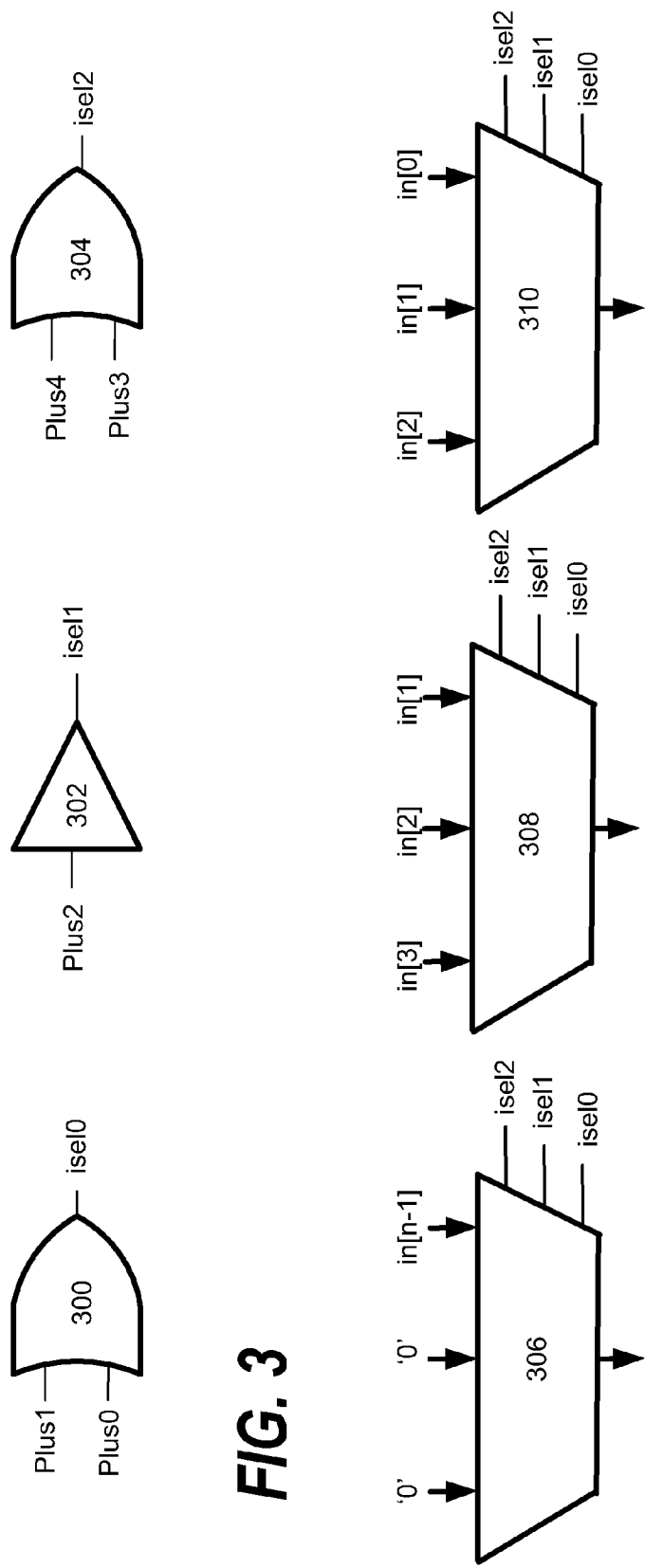
FIG. 3 is a schematic diagram illustrating a first level multiplexer configuration.

FIG. 3 illustrates three multiplexers 306, 308 and 310 that correspond to top row of multiplexers 212, 204 and 202 in FIG. 2 respectively. The three multiplexers 306, 308 and 310 illustrate the 3 input lines and the 3 multiplex select signals. The multiplex select signals Ise10, ise11 and ise12 result from the two OR gates 300 and 304 and driver 302 which receive the input mode select signals Plus0, Plus1, Plus2, Plus3, and Plus4.

Figure 4:
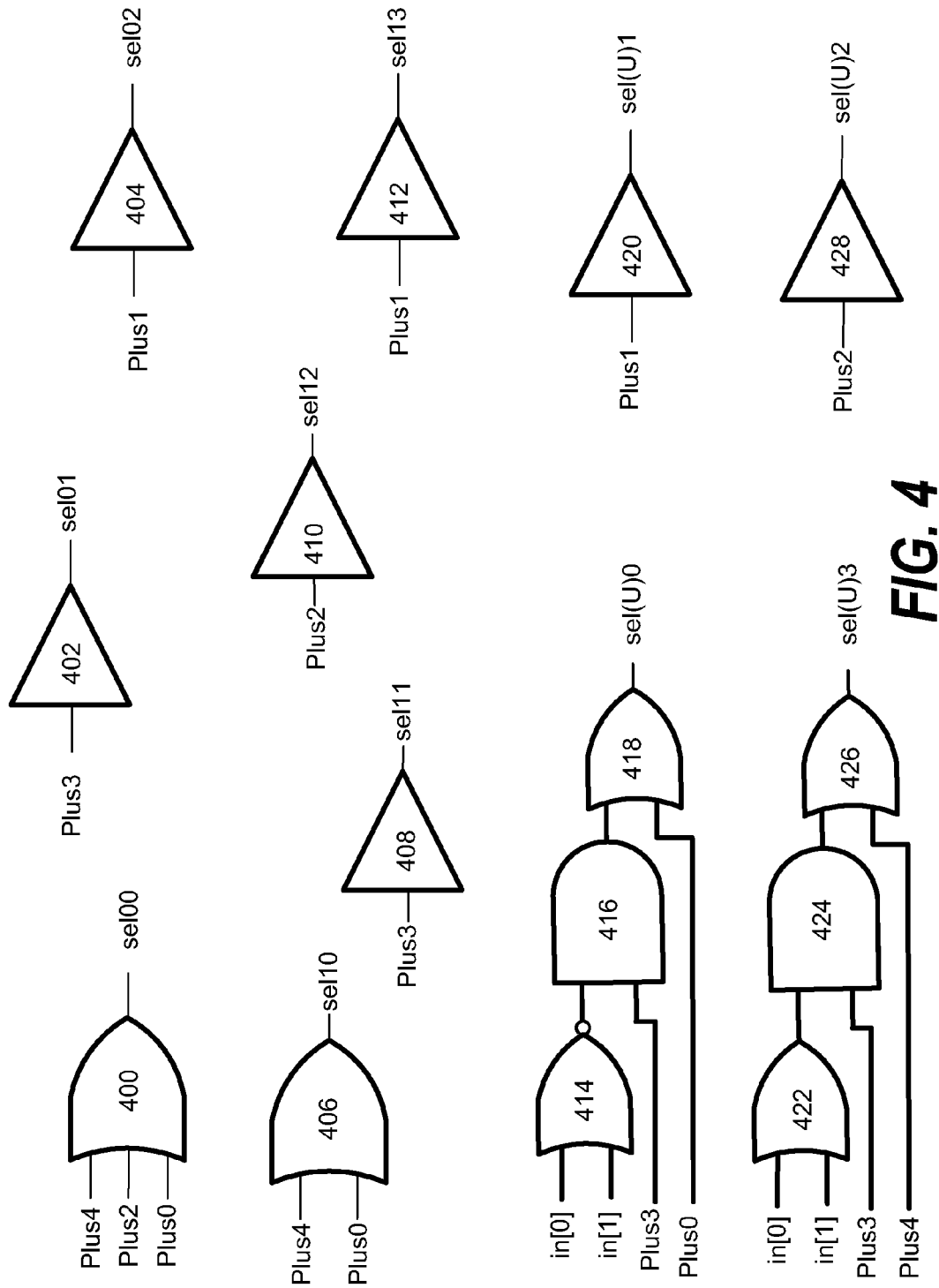
FIG. 4 is a schematic diagram of the select signal generation for a second level multiplexer configuration.

FIG. 4 illustrates the schematic logic to convert the mode select signals Plus0, Plus1, Plus2, Plus3, and Plus4 to the multiplex select signals for the bottom row of multiplexers 232, 234, 236, 238, 240 and 242 of FIG. 2. In FIG. 4, OR gate 400 and drivers 402 and 404 provide the three multiplex select signals (signals se100, se101 and se102) for the least significant bit position bottom row multiplexer 232 (FIG. 2). The other bottom row multiplexers 234, 236, 238, 240 and 242 (FIG. 2) each receive four multiplex select signals. OR gate 406 and drivers 408, 410 and 412 provide the multiplexer select signals sel10, sel11, sel12, sel13 and sel14 for multiplexer 234 (FIG. 2). The other multiplexers 236, 238 and 240 also receive multiplex select signals as shown for multiplexer 242. The most significant bit multiplexer 242 (FIG. 2) receives the four multiplexer select signals sel(U)0, sel(U)1, sel(U)2 and sel(U)3. For sel(U)0, both the least significant bit in[0] and the next to the least significant bit in[1] of the input data word are provided to NOR gate 414 and combined with Plus 3 and Plus0 in AND gate 416 and OR gate 418 as shown. In a similar manner, for sel(U)3, in[0] and in[1] are provided to OR gate 422 and combined with Plus3 and Plus4 in AND gate 424 and OR gate 426. Plus2 provides sel(U)1 from driver 420 and Plus2 provides sel(U)2 from driver 428.

Figure 5:
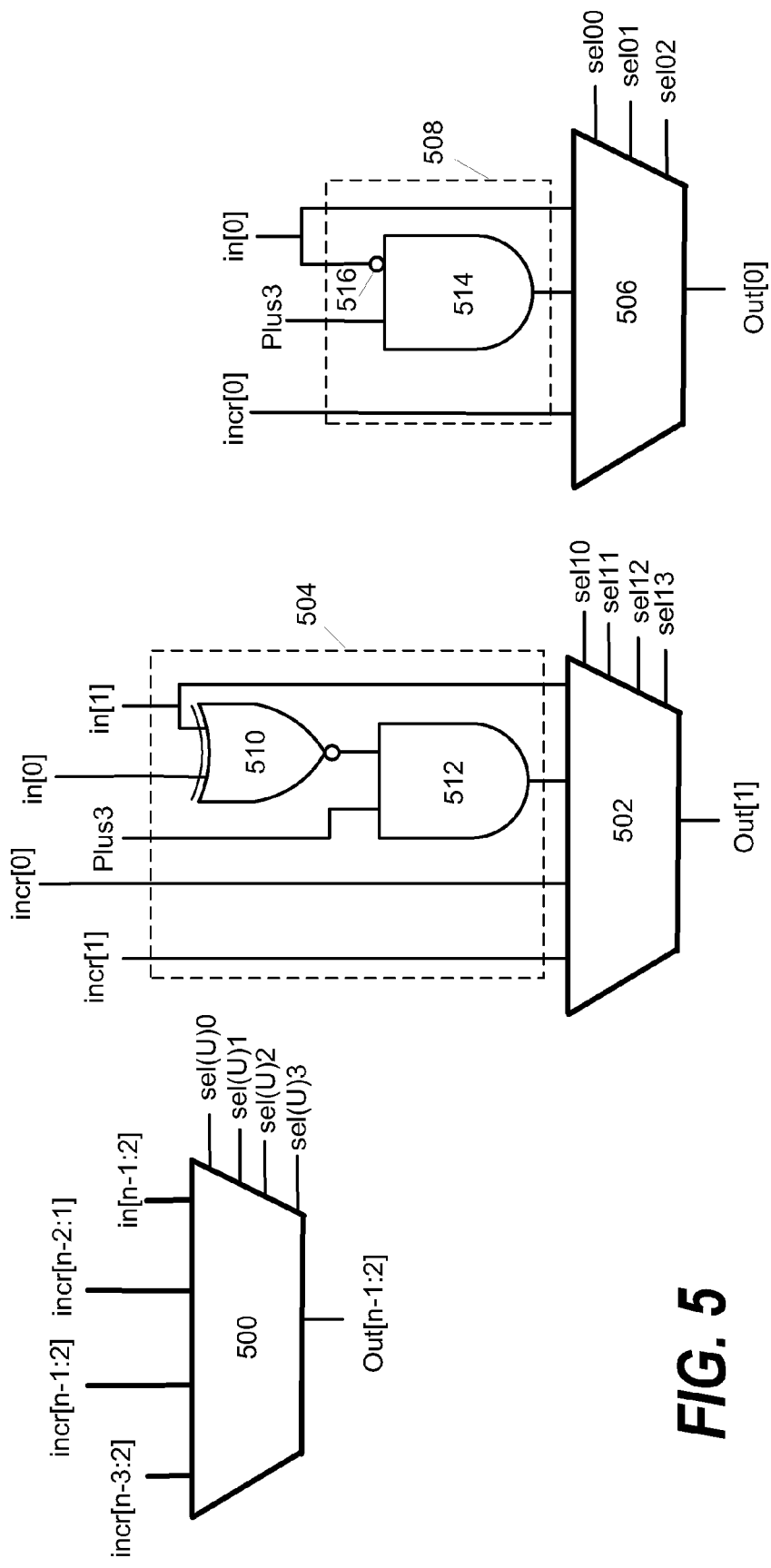
FIG. 5 is a schematic diagram of the second level multiplexer configuration.

In FIG. 5, the multiplexer select signals generated by the circuitry illustrated in FIG. 4 are provided to multiplexers 500, 502 and 506. Multiplexer 500 represents several multiplexers which receive four inputs to provide the Out[n-1:2] values of the output data word. In other words, the binary values of the output data word from the most significant bit position to the third least significant bit position Out[2] are each provided by multiplexers such as multiplexer 500 connected to receive the multiplexer select signals sel(U)0, sel(U)1, sel(U)2 and sel(U)3 with inputs provided as illustrated.

In FIG. 5, the multiplexer 502 provides the output data word bit position value Out[1]. The four input lines of the multiplexer 502 are selected by the multiplexer select lines sel10, sel11, sel12, and sel13 as discussed. However, the four input lines included logic circuitry 504 (corresponding to logic circuit 250 of FIG. 2) that combine the input data word values in[0] and in[1] in an Exclusive NOR gate 510 which is logically combined with Plus3 in an AND gate 512 to provide one of the inputs. The other inputs are incr[1] and incr[0], the two least significant bit position values from the incrementor 222 (FIG. 2) and the input data word bit position value in[1] as shown. These inputs incr[1], incr[0], in[0], and in[1] are provided by the data bus 272 from lines 230 shown in FIG. 2.

Likewise, logical circuitry 508 (corresponding to logic circuit 246 in FIG. 2) provides the three inputs (line 248 in FIG. 2) to the multiplexer 506. Two inputs incr[0] and in[0] are provided directly to multiplexer 506 but the remaining input is provided by logically combining in[0] through an inverter 516 to an AND gate 514 that also receives as an input Plus3. The inputs incr[0] and in[0] are provided by the data bus 272 from lines 228 shown in FIG. 2.

This expanded scope incrementor uses the multiplexers to provide shifting functions and bit position direction functions while employing the single constant incrementor and logical circuitry to provide the frequently used function of adding these integer values without the need of a full scale adder. This concept can also be extended to add +1, +2, +3, +4, +5, +6, +7, +8, etc with some additional hardware. As previously discussed, the incrementor can also be modified to produce a carry bit. This carry along with the upper 2 bits from the incrementor INCR[N-1], INCR[N-2] can be sent to a mux that can select one of them depending upon the mode, to generate an overflow bit indicating that the output of this circuitry has overflowed. Further, the mode select signals are expected to be one-hot, i.e. at any given time, one and only one of Plus0, Plus1, Plus2, Plus3, Plus4 can be HIGH. However, with extra logic circuitry, the mode select can be encoded as a 3-bit signal instead of 5 separate mode select signals.

While particular embodiments of the present invention have been shown and described, it will be obvious to those skilled in the art that based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. An incrementor circuit for computing an output data word by increasing an input data word magnitude by one of a plurality of integers, said incrementor circuit comprising:
   a mode circuit for receiving an input mode indication designating one of the plurality of integers for increasing the input data word magnitude and providing a mode select signal in response thereto;
   a first multiplex circuit connected to receive the input data word and providing binary values of selected bit positions of the input data word to a constant integer incrementor according to the mode select signal;
   the constant integer incrementor increasing the magnitude of received binary values of the selected bit positions of the input data word and connected to provide binary values to a second multiplex circuit; and
   the second multiplex circuit including logic to receive the parallel binary values from the constant value incrementor and the input data word and, according to the increment mode signal, provide an output representing the input data word magnitude increased by a selected integer value.

2. The incrementor circuit according to claim 1 wherein constant integer adder adds a single bit value of 1 to the input data word.

3. The incrementor circuit according to claim 1 wherein the plurality of integer values includes at least 3 non-zero integers.

4. The incrementor circuit according to claim 1 wherein the second multiplex circuit includes a logic circuit to combine the mode select signal with one of the input data word bit position values.

5. The incrementor circuit according to claim 1 wherein the constant integer adder is connected to receive a null value at a most significant bit position.

6. The incrementor circuit according to claim 1 wherein the second multiplex circuit includes an input select logic circuit logically combining the mode select signal with input data word bit position values.

7. The incrementor circuit according to claim 1 wherein the second multiplex circuit includes an inverter to receive a least significant bit position value from the input data word to provide an inverted value to an AND gate which is also connected to receive the mode select signal.

* * * * *